United States Patent
Plummer et al.

(10) Patent No.: US 11,685,118 B2
(45) Date of Patent: Jun. 27, 2023

(54) TECHNIQUES FOR POWDER DELIVERY IN ADDITIVE FABRICATION AND RELATED SYSTEMS AND METHODS

(71) Applicant: Formlabs, Inc., Somerville, MA (US)

(72) Inventors: Luke Plummer, Jericho, VT (US); Maria Rosa Ruiz, Malden, MA (US); Carlos Ruiz-Vargas, Waltham, MA (US); Robert Morgan, Winchester, MA (US); Joseph Johnson, Norwood, MA (US); Connor Evans, Somerville, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 17/326,700

(22) Filed: May 21, 2021

(65) Prior Publication Data

US 2021/0362419 A1    Nov. 25, 2021

Related U.S. Application Data

(60) Provisional application No. 63/028,158, filed on May 21, 2020.

(51) Int. Cl.
| | |
|---|---|
| *B29C 67/00* | (2017.01) |
| *B29C 64/343* | (2017.01) |
| *B33Y 30/00* | (2015.01) |
| *B33Y 40/00* | (2020.01) |
| *B29C 64/329* | (2017.01) |

(Continued)

(52) U.S. Cl.
CPC ........... *B29C 64/343* (2017.08); *B22F 12/52* (2021.01); *B22F 12/57* (2021.01); *B29C 64/329* (2017.08); *B33Y 30/00* (2014.12); *B33Y 40/00* (2014.12); *B22F 10/28* (2021.01); *B29C 64/153* (2017.08); *B33Y 10/00* (2014.12)

(58) Field of Classification Search
CPC ..... B29C 64/329; B29C 64/343; B33Y 30/00; B33Y 40/00; B22F 12/52; B22F 12/57
See application file for complete search history.

(56) References Cited

U.S. PATENT DOCUMENTS

2008/0230414 A1    9/2008  Perret et al.

FOREIGN PATENT DOCUMENTS

| WO | WO 2018/056988 A1 | 3/2018 |
|---|---|---|
| WO | WO 2019/097256 A1 | 5/2019 |

OTHER PUBLICATIONS

International Search Report and Written Opinion dated Sep. 16, 2021 for International Application No. PCT/US2021/033577.

*Primary Examiner* — Ryan M Ochylski
(74) *Attorney, Agent, or Firm* — Wolf, Greenfield & Sacks, P.C.

(57) ABSTRACT

Techniques are described for consistently moving powder from a hopper into a trough for subsequent delivery into a build area of an additive fabrication system. A powder delivery apparatus may comprise a hopper, a trough, and a doser. The doser may be configured to rotate about an axis and may include a recess that, when the doser is rotated about the axis, travels into and out of the hopper and into and out of the trough. As a result, when powder is present in the hopper, the recess may carry powder from the hopper to the trough when the doser rotates. The trough and doser may be configured so that when the trough contains the desired amount of powder for recoating, the doser does not transfer additional material from the hopper into the trough. As a result, the amount of powder in the trough may be self-regulating.

20 Claims, 12 Drawing Sheets

(51) Int. Cl.
   *B22F 12/57* (2021.01)
   *B22F 12/52* (2021.01)
   *B33Y 10/00* (2015.01)
   *B29C 64/153* (2017.01)
   *B22F 10/28* (2021.01)

TECHNIQUES FOR POWDER DELIVERY IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 63/028,158, filed May 21, 2020, titled "Techniques For Powder Delivery in Additive Fabrication and Related Systems And Methods," which is hereby incorporated by reference in its entirety.

BACKGROUND

Additive fabrication, e.g., 3-dimensional (3D) printing, provides techniques for fabricating objects (also referred to as "parts") by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as selective laser sintering, or "SLS," solid objects are created by successively forming thin layers by selectively fusing together powdered material. One illustrative description of selective laser sintering may be found in U.S. Pat. No. 4,863,538, incorporated herein in its entirety by reference.

SUMMARY

According to some aspects, a powder delivery apparatus is provided for an additive fabrication system, the powder delivery apparatus comprising a hopper configured to hold a powder, a trough adjacent to a build area of the additive fabrication system, and a doser comprising a cylindrical barrel that includes a recess, the doser configured to rotate about an axis such that the recess may be moved into and out of the trough and the hopper by rotating the doser about the axis.

According to some aspects, an additive fabrication system is provided comprising a hopper configured to hold a powder, a trough adjacent to a build area of the additive fabrication system, a doser comprising a cylindrical barrel that includes a recess, the doser configured to rotate about an axis such that the recess may be moved into and out of the trough and the hopper by rotating the doser about the axis, thereby carrying powder within the recess of the doser from the hopper to the trough and/or from the trough to the hopper, a flipper configured to move powder out of the trough to an area adjacent to the build area, a recoater configured to move powder from the area adjacent to the build area onto the build area, and at least one processor configured to deliver powder from the hopper to the build area of the additive fabrication system by rotating the doser about the axis a plurality of times to convey powder from the hopper to the trough, operating the flipper to move powder out of the trough to the area adjacent to the build area, and operating the recoater to move powder from the area adjacent to the build area onto the build area.

According to some aspects, a method is provided of delivering powder to a build area of an additive fabrication system, the method comprising operating a doser arranged within a hopper holding powder to deposit a desired volume of powder in a trough, wherein the doser comprises a cylindrical barrel that includes a recess, and wherein operating the doser comprises (a) rotating the doser such that the recess of the doser collects a dose of powder from within the hopper, (b) rotating the doser so that the recess moves into the trough, thereby depositing at least some of the dose of powder into the trough, and repeating steps (a) and (b) until an amount of powder in the trough reaches a steady state.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Some additive fabrication techniques, such as Selective Laser Sintering (SLS), form parts by fusing source material, such as one or more fine powders, together into larger solid masses. This process of fusing a source material is referred to herein as "consolidation," and typically occurs by directing sufficient energy (e.g., heat and/or light) to the material to cause consolidation. Some energy sources, such as lasers, allow for direct targeting of energy into a small area or volume. Other energy sources, such as heat beds or heat lamps, direct energy into a comparatively broader area or volume of material.

Figure 1:
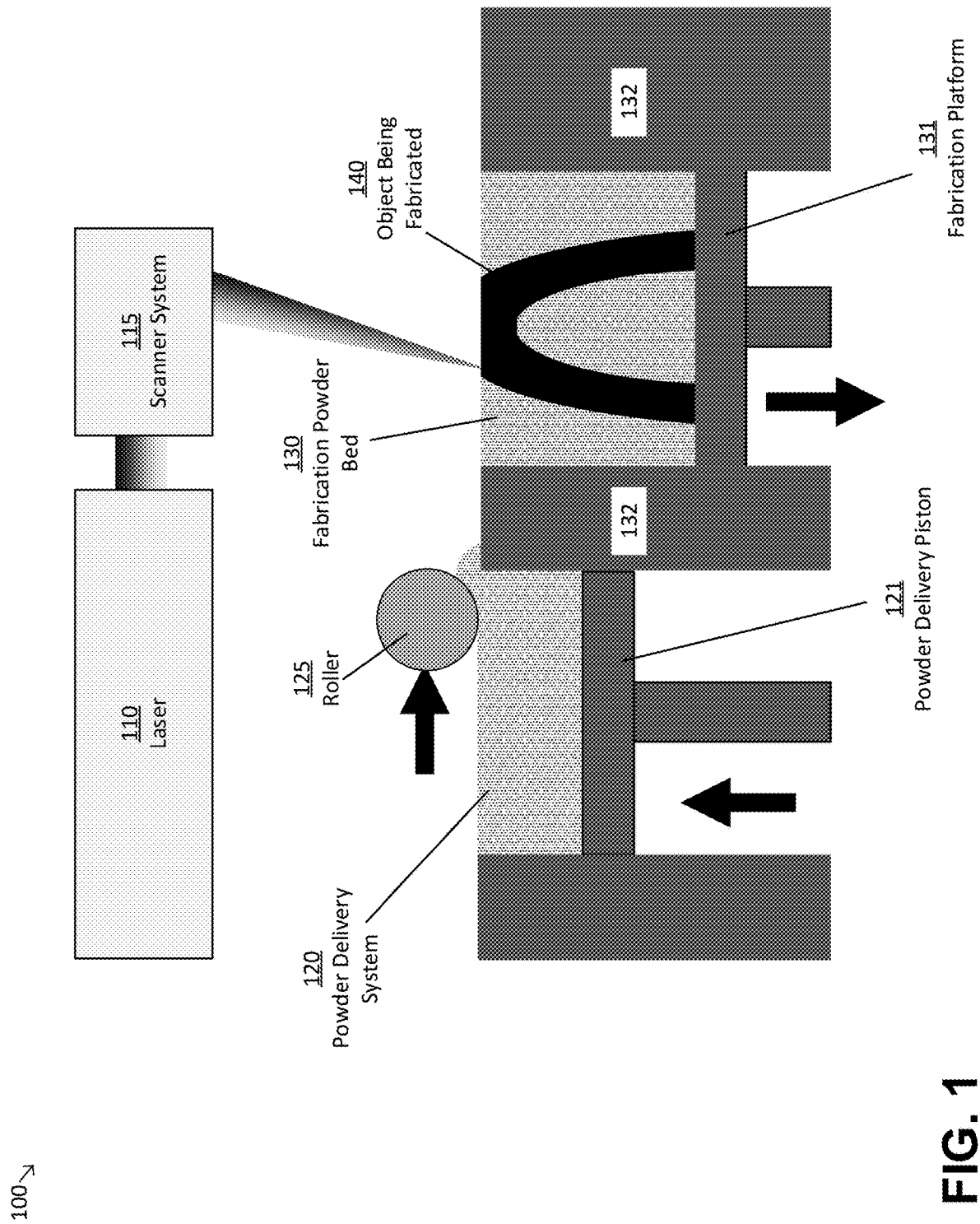
FIG. 1 depicts an illustrative conventional SLS additive fabrication device.

An illustrative conventional SLS additive fabrication device is illustrated in FIG. 1. In the example of FIG. 1, SLS device 100 comprises a laser 110 paired with a computer-controlled scanner system 115 disposed to operatively aim the laser 110 at the fabrication bed 130 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 1, the material in the fabrication bed 130 is selectively heated by the laser in a manner that causes the powder material particles to fuse (sometimes also referred to as "sintering" or "consolidating") such that a new layer of the object 140 is formed. Sintering is suitable for use with many different powdered materials, including any of various forms of powdered nylon, powdered metal (in which case the process may be referred to as direct metal laser sintering, or DMLS, rather than SLS), powdered ceramics, organic powders (e.g., wood), inorganic powders (e.g., flour, cement, plaster), or combinations thereof. In some cases, areas around the fabrication bed (e.g., the walls 132, the platform 131, etc.) may include heating elements to heat the powder in the fabrication bed. Such heaters may be used to preheat unconsolidated material, as discussed above, prior to consolidation via the laser.

Once a layer has been successfully formed, the fabrication platform 131 may be lowered a predetermined distance by a motion system (not pictured in FIG. 1). Once the fabrication platform 131 has been lowered, the recoater 125 (e.g., a roller in FIG. 1) may be moved across the fabrication bed 130, spreading a fresh layer of material across the fabrication bed 130 to be consolidated as described above. Mechanisms configured to apply a consistent layer of material onto the fabrication bed may include the use of wipers, rollers, blades, and/or other levelling mechanisms for moving material from a source of fresh material to a target location.

Since material in the powder bed 130 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

In some conventional systems, the process of repeatedly depositing a layer of powder into the build area may rely upon complex closed-loop control systems that include sensors for carefully metering out the amount of powder needed to precisely cover the build area at a constant depth. Some other conventional systems simply provide more powder than is needed and push the excess into an overflow or catch bin. In the case of closed-loop control, the additive fabrication system requires complex electronics that are capable of operating in a high temperature environment, whereas in the case of catching overflow, the system requires additional space for the overflow bin, and this approach can be wasteful because excess powder is produced.

Figure 2A:
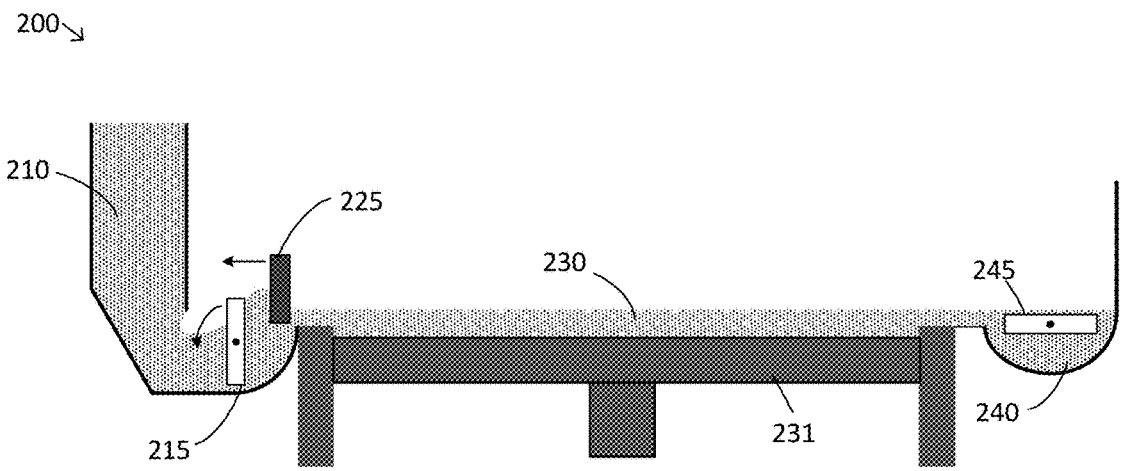
FIGS. 2A-2C depict a process of powder delivery in a conventional system that relies on an overflow bin.
Figure 2B:
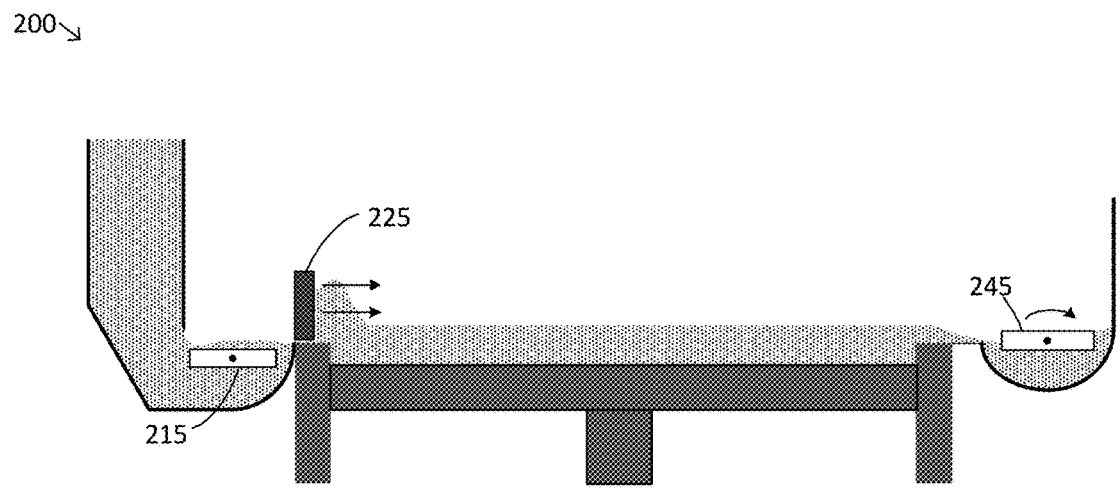
Figure 2C:
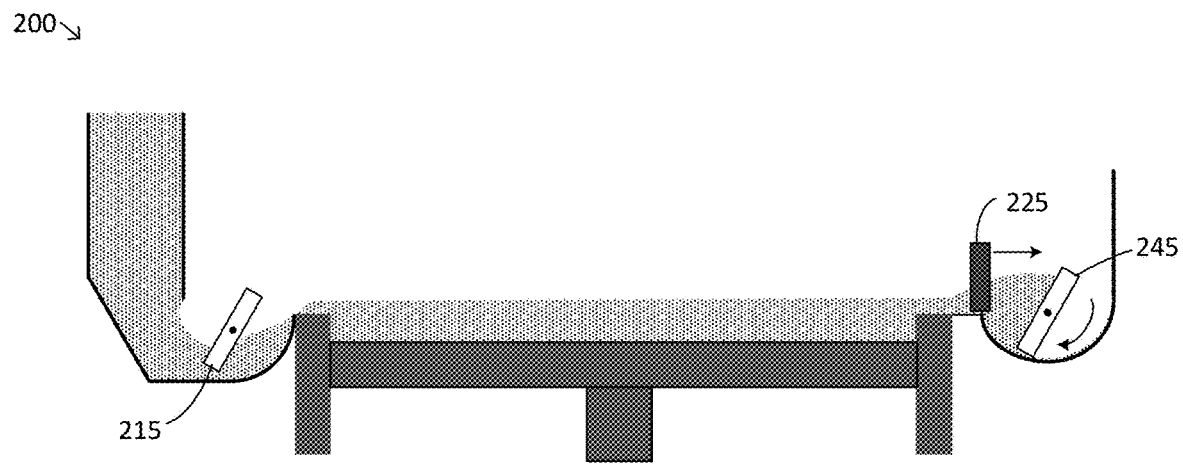

For purposes of further explanation, FIGS. 2A-2C depict a process of powder delivery in a conventional system that relies on an overflow bin. As shown in FIG. 2A, additive fabrication system 200 comprises a hopper 210 containing powder that is to be deposited over the powder bed 230, the top of which represents the build area and is arranged over build platform 231. Gravity may cause the powder in hopper 210 to settle into a pile at the bottom of the hopper, which includes (or is coupled to) a flipper 215 that can rotate to push up powder from the bottom of this powder pile. The system 200 includes a recoater 225 that can move back and forth over the build area and, in the example of FIG. 2A-2B, can push powder pushed up by flipper 215 onto the build area.

Any excess powder that is not deposited onto the powder bed 230 (e.g., because the recoater is configured to create a layer of powder with a fixed height, and more powder than was needed to create this layer was pushed away from the hopper 210) is pushed into a trough 240 which includes flipper 245. This powder can be reused for subsequent recoating operations by operating flipper 245 to push up powder for the recoater to push over the build area, as shown in FIG. 2C.

In some cases, there may be a hopper on both sides, but irrespective of whether there are two or one hoppers, the powder delivery method depicted by FIGS. 2A-2C has a drawback that powders that have low flowability (e.g., low angle of repose), and/or have inconsistent flowability may be difficult to accurately and consistently meter out from the hopper. For instance, if the powder flow is too low, there may be a shortage of powder deposited over the build area because powder is compacted within the flippers 215 and/or 245 and/or within the pile of powder at the bottom of the hopper.

The inventors have recognized and appreciated techniques for consistently moving powder from a hopper into a trough for subsequent delivery into a build area of an additive fabrication system. These techniques do not require complex closed-loop control systems and may be effective irrespective of the flowability of the powder. Moreover, in at least some cases, there may be no deposition of excess powder because the amount of powder that is metered into the trough may be precisely controlled to be the amount needed for recoating. In addition, delivery of powder using these techniques may not depend on flow properties of the powder, such as the angle of repose, because effective movement of the powder does not rely on the powder flowing into a desired location.

According to some embodiments, an additive fabrication device may comprise a powder delivery apparatus that comprises a hopper, a trough, and a doser arranged between the hopper and the trough. The doser may be configured to rotate about an axis and may include at least one recess (e.g., a concave region) that, when the doser is rotated about the axis, travels into and out of the hopper and into and out of the trough. As a result, when powder is present in the hopper, the recess may carry powder from the hopper to the trough when the doser rotates. The trough and doser may be configured so that when the trough contains the desired amount of powder for recoating, the doser does not transfer additional material from the hopper into the trough. As a result, the amount of powder in the trough may be self-regulating. That is, instead of the amount of powder in the trough continuing to increase, the amount may stop increasing when it reaches a desired level. As such, the powder in the trough may be delivered to a build area (e.g., by a recoater), resulting in deposition of a consistent amount of powder for every layer during fabrication.

Following below are more detailed descriptions of various concepts related to, and embodiments of, techniques for moving powder from a hopper into a trough for subsequent delivery into a build area of an additive fabrication system. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 3:
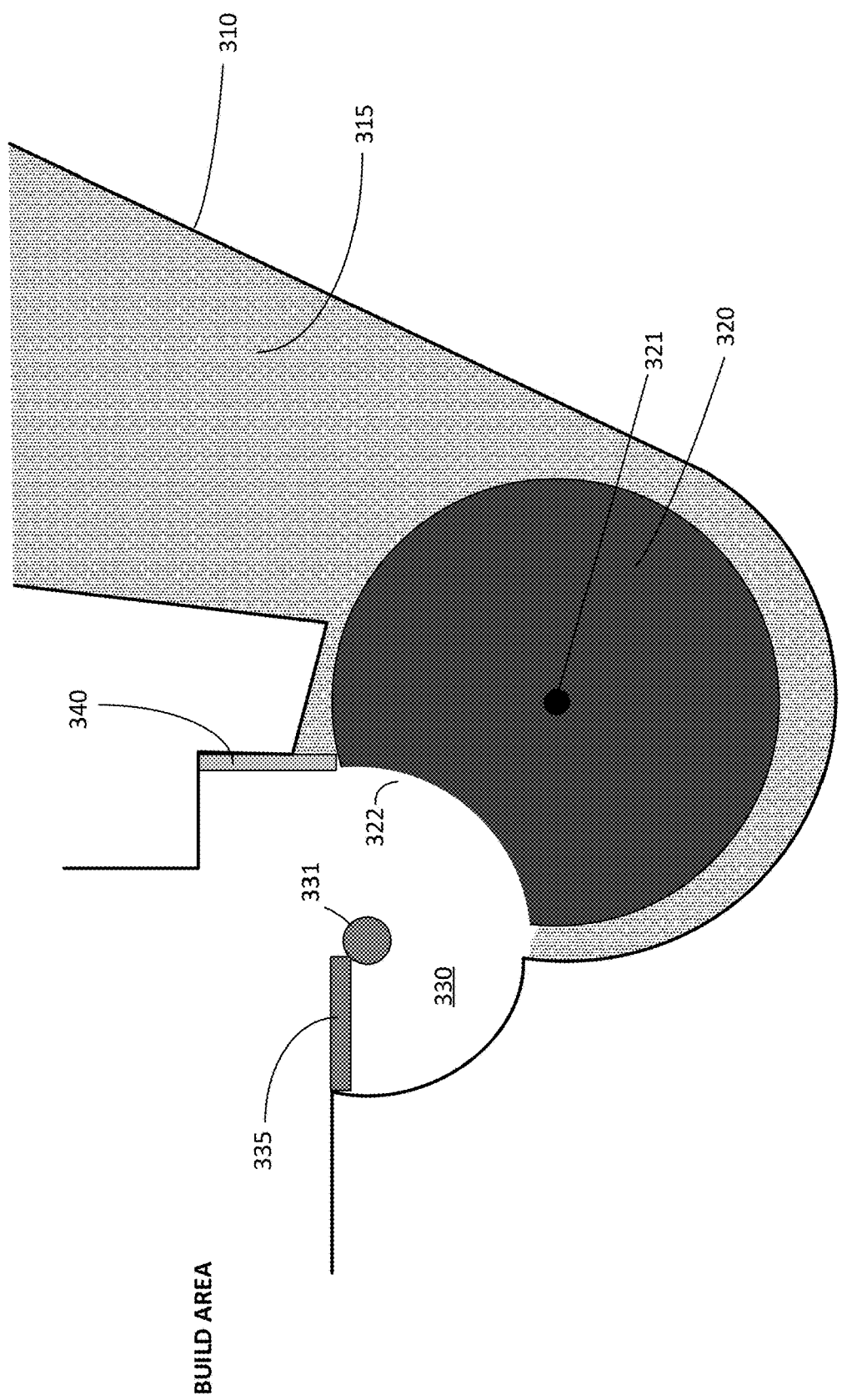
FIG. 3 depicts an illustrative powder delivery apparatus, according to some embodiments.

FIG. 3 depicts an illustrative powder delivery apparatus, according to some embodiments. Apparatus 300 may be arranged within a suitable additive fabrication system, such as additive fabrication device 100 shown in FIG. 1, wherein apparatus 300 would replace the powder delivery system 120, allowing the roller 125 or any other suitable recoating device to distribute powder supplied from the apparatus 300 onto a build area.

In the example of FIG. 3, apparatus 300 comprises a gravity fed hopper 310 in which a powder 315 may be arranged. At, or proximate to, the bottom of the hopper is a doser 320 which, in the example of FIG. 3, is a cylinder configured to rotate about an axis 321 and includes a recess 322. In the example of FIG. 3, the recess 322 is a concave region, although in general a recess of any suitable shape may be formed within the doser. Trough 330 is arranged next to the doser so that the doser is between the trough 330 and hopper 310. Trough 330 includes a flipper 335 configured to rotate about the axis 331 and thereby push up any powder in the trough so that it can be subsequently pushed into the build area by a recoater (not shown). Apparatus 300 also includes a component 340 which serves to retain powder 315 within the hopper. Component 340 may be flexible (e.g., may comprise a silicone rubber), rigid, or in some cases may be omitted in favor of a suitably small gap.

According to some embodiments, the doser may comprise any number of recesses, such as two or more, and is not limited to just the single recess 322 shown in FIG. 3. For instance, the doser may include multiple separate recesses arranged along the length of the doser (e.g., arranged along a line parallel to axis 321) and/or multiple separate recesses arranged around the perimeter of the doser (e.g., diametrically opposing one another across the axis 321). Moreover, the recesses may have any suitable shape and are not limited to the concave circular cutout shape shown in FIG. 3 (although there may be an advantage to this shape, as discussed below).

In operation, rotation of the doser may collect powder from within the hopper and move it into the trough 330 by carrying the powder within the recess 322 as discussed further below. Because of the relative position of the doser and trough, eventually the trough contains enough powder that when the doser rotates into the hopper, the recess 322 is already full of powder. As a result, no additional powder is deposited in the trough when the doser rotates, and a steady state of the powder level is reached. As may be noted from FIG. 3, the trough may contain enough powder for this to occur when the powder level in the trough reaches the upper edge of the cutout portion 322 as shown in FIG. 3. If the volume of the trough up to this height is the same as the amount of powder needed to recoat a single layer of powder in the build area, operating the flipper to push up this powder for recoating may allow recoating without waste powder (or with a minimal amount of waste powder).

According to some embodiments, the doser 320 may be arranged at the bottom of the hopper 310 such that powder within the hopper sits alongside and beneath the doser 320. For instance, the doser may be, as shown in FIG. 3, arranged so that there is a gap between the bottom of the doser and the bottom of the hopper, and this gap contains powder. This arrangement may allow the recess in the doser to rotate through the hopper and pick up powder within it without then dropping the powder from the recess.

According to some embodiments, doser 320 may comprise, or may consist of, a metal (e.g., steel) and/or a high strength plastic. In some embodiments, the doser 320 may comprise a non-stick coating (e.g., PTFE) to avoid powder sticking to the doser. In some embodiments, the doser may be coupled to an electrical ground to avoid electrostatic sticking of the powder to the doser (e.g., for metal powder).

According to some embodiments, in operation, the doser may be controlled to rotate at a constant speed when moving the cutout portion 322 from the trough into the hopper and back to the trough. The doser may remain stationary when the flipper is operated to remove powder from the trough. Alternatively, the doser may move continuously with the motion of the flipper timed and synchronized with this motion to remove powder from the trough with the flipper without causing the doser to stop moving.

An additional benefit of the configuration of powder delivery apparatus 300 shown in FIG. 3 compared with the apparatus shown in FIGS. 2A-2C is that powder in the hopper 310 may be kept cool for longer before the powder is delivered to the build area. In the additive fabrication system 200 shown in FIGS. 2A-2C, powder in the hopper that is awaiting delivery to the build area is adjacent to the build area, and therefore may be heated to some extent due to direct heating of powder in the build area. Since powder can have reduced flow properties (e.g., may become clumpy) when heated, this arrangement may therefore cause undesired effects. It may be noted that this configuration also means that heat applied to the build area is not 'wasted' by also heating powder in the hopper in system 200. That is, heating of the build area next to apparatus 300 may be more efficient because less heat is lost to nearby powder not present in the build area compared with system 200.

In contrast, powder in the hopper 310 in powder delivery apparatus 300 is further separated from the build area due to being on the other side of the doser 320. As a result, less indirect heating of the powder in the hopper may occur compared with system 200. While powder in the trough 330 may be indirectly heated to some extent, this heating may be minimal since that powder is delivered to the build shortly after it is moved into the trough from the hopper.

Figure 4A:
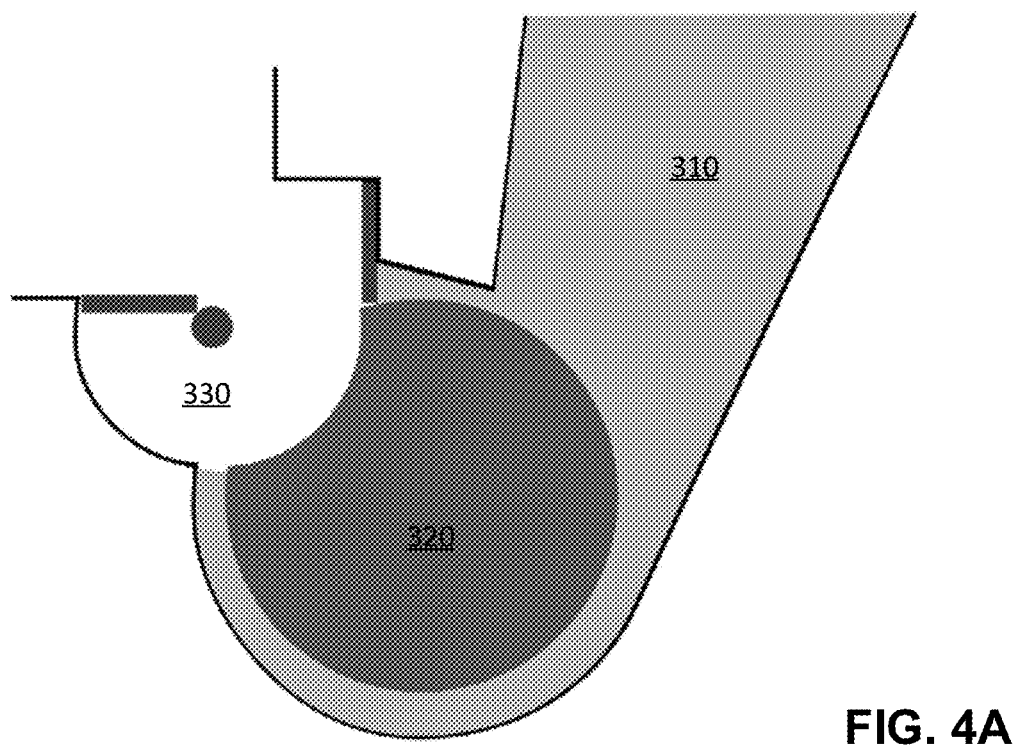
FIGS. 4A-4J depict a sequence of operating the powder delivery apparatus of FIG. 3, according to some embodiments.

FIGS. 4A-4J depict a sequence of operating the powder delivery apparatus of FIG. 3, according to some embodiments. In FIG. 4A, the powder delivery apparatus matches the configuration shown in FIG. 3, in which the trough 330 is empty, the doser 320 is arranged so the cutout portion is within the trough, and the hopper 310 is filled with powder.

Figure 4B:
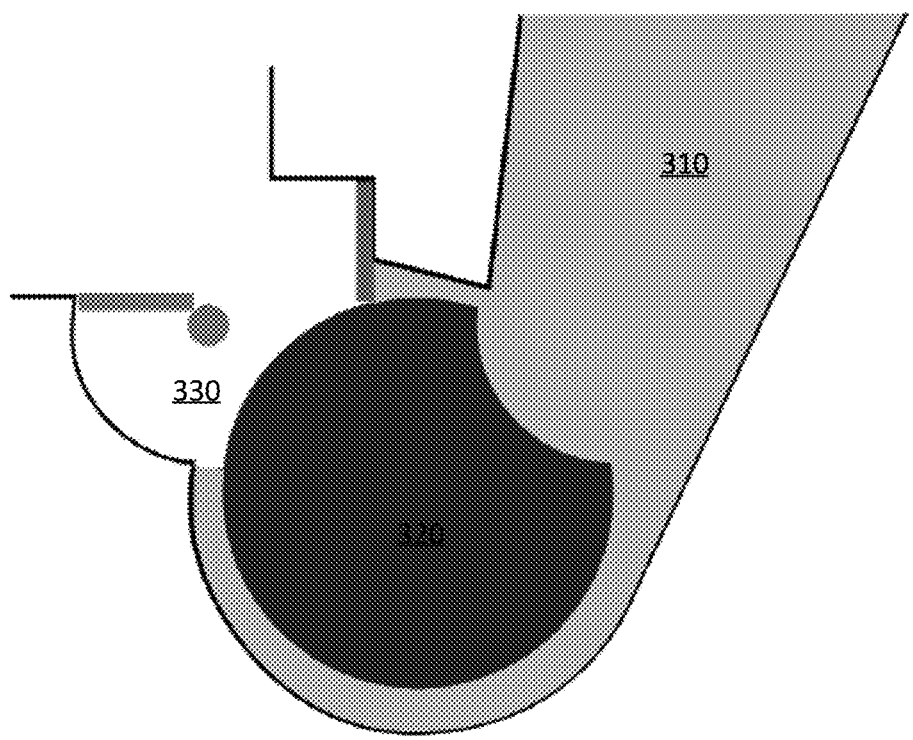
Figure 4C:
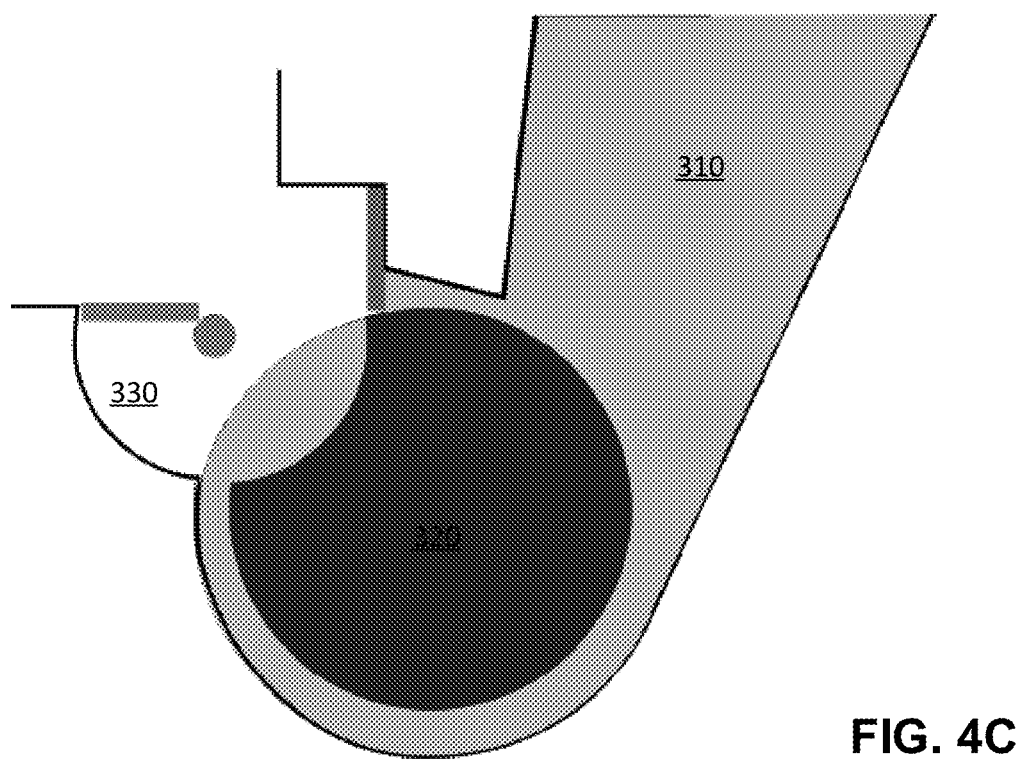
Figure 4D:
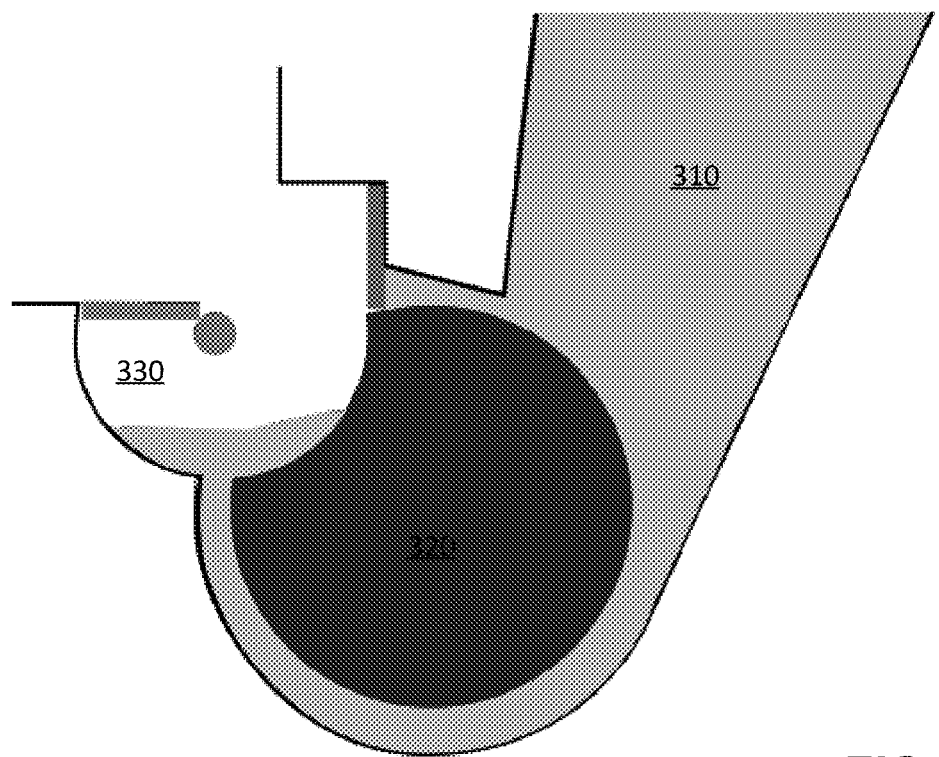

The doser is then operated to rotate as shown in FIG. 4B. This causes the cutout portion of the doser to fill with powder. As the doser continues to rotate, this powder is conveyed into the trough, as shown in FIG. 4C. This powder may then settle in the trough as shown in FIG. 4D.

Figure 4E:
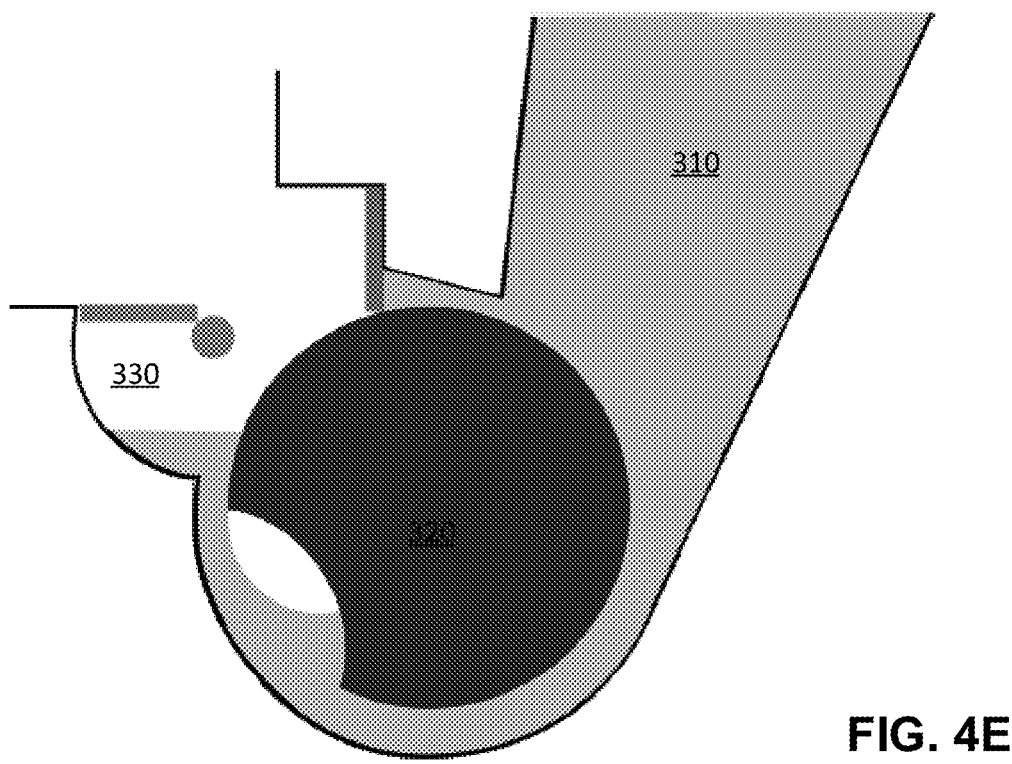
Figure 4F:
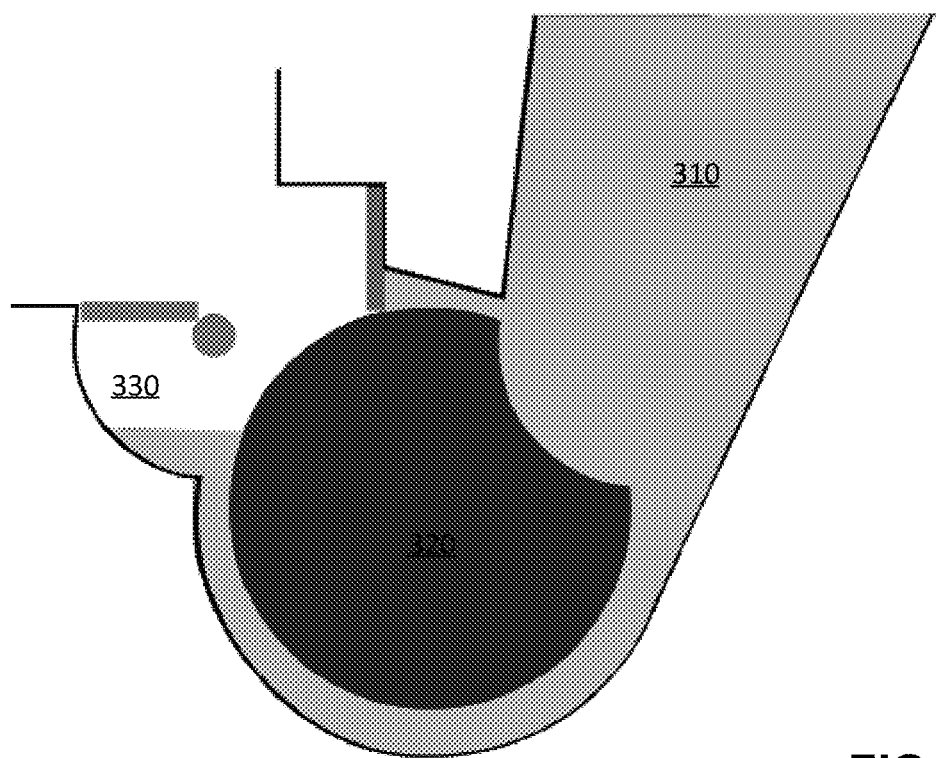
Figure 4G:
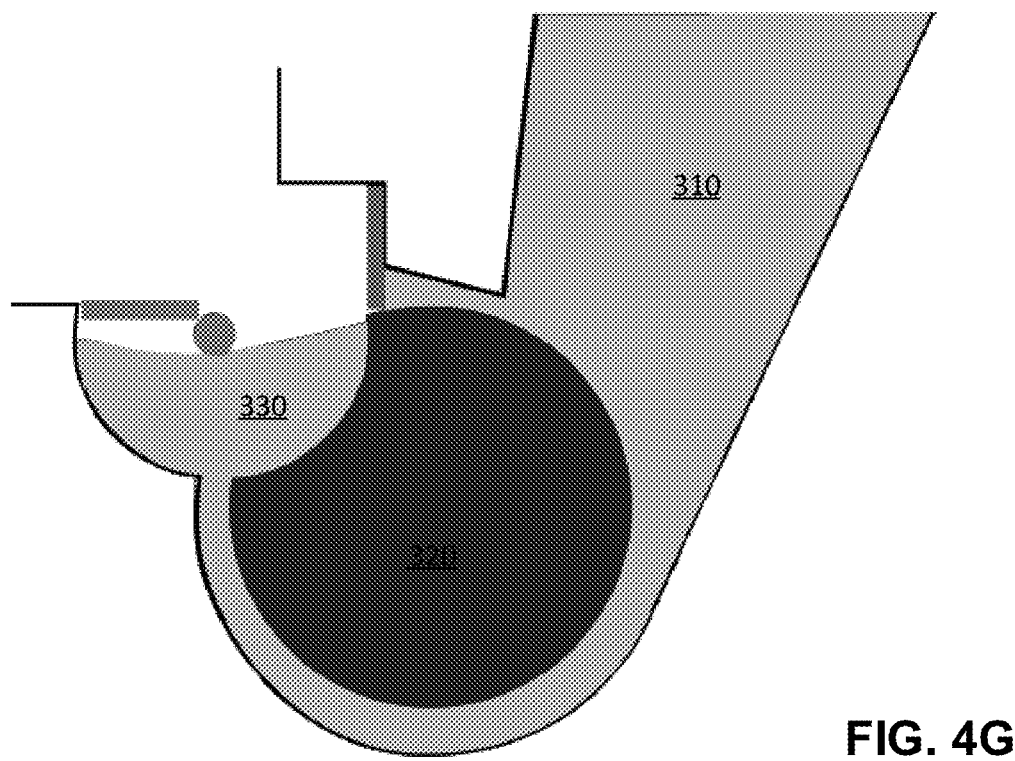

As shown in FIG. 4E, the doser rotates and carries some powder with it, although as shown the cutout portion is not filled with powder. As a result, when the doser rotates around back to the trough again, as shown in FIGS. 4F and 4G, there is a net addition of powder to the trough. This process of adding powder as shown in FIGS. 4E-4G continues until the powder in the trough reaches a steady state level. As may be appreciated, the less powder that is carried in the cutout from the trough to the hopper, the more powder is added to the trough. As such, the powder level in the trough may quickly increase, then more slowly increase, until the steady state level is reached.

Figure 4H:
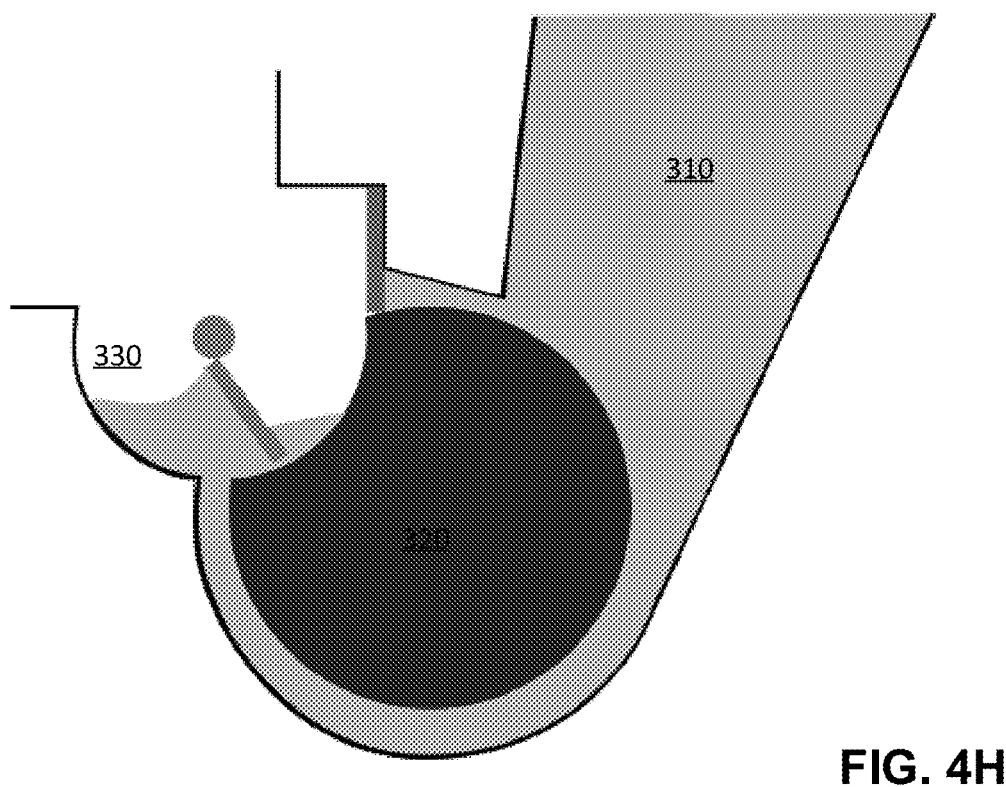
Figure 4I:
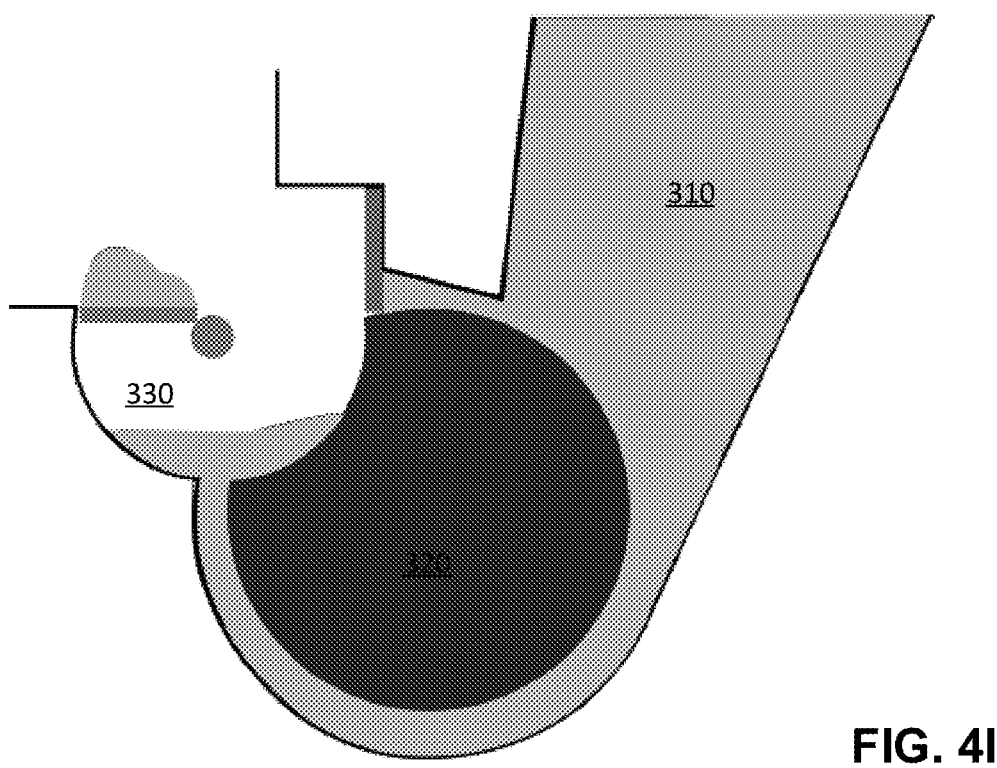

When the trough is full the flipper in the trough is operated to scoop out powder to provide to the recoater, as shown in FIGS. 4H and 4I. The system may be configured to assume the trough is full after a set number of rotations of the doser have been performed. Since the process is self-regulating, it is not an issue if the doser rotates more times than necessary to fill the trough.

Figure 4J:
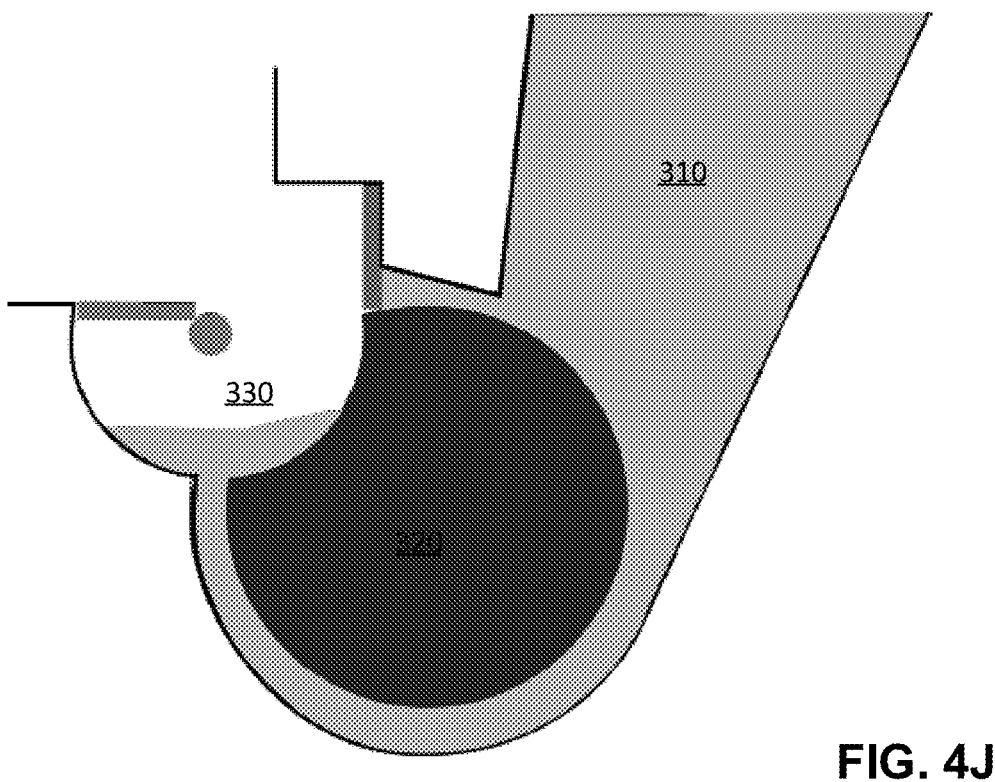

Although not shown in FIG. 4I, the powder removed from the trough by the flipper may be pushed onto the build area by a recoater as discussed above. Subsequently, there may be some powder in the trough as shown in FIG. 4J. Further rotation of the doser can increase this level as before, so the process repeats from FIG. 4E as discussed above.

In the sequence of operations depicted in FIGS. 4A-4J, the doser may be operated to move clockwise or counter-clockwise. The doser may be operated to move in the same direction in each step (e.g., continuously moving clockwise, or continuously moving counter-clockwise), or in some cases may move in a reciprocating motion (e.g., clockwise, then counter-clockwise, then clockwise, etc.).

Figure 5:
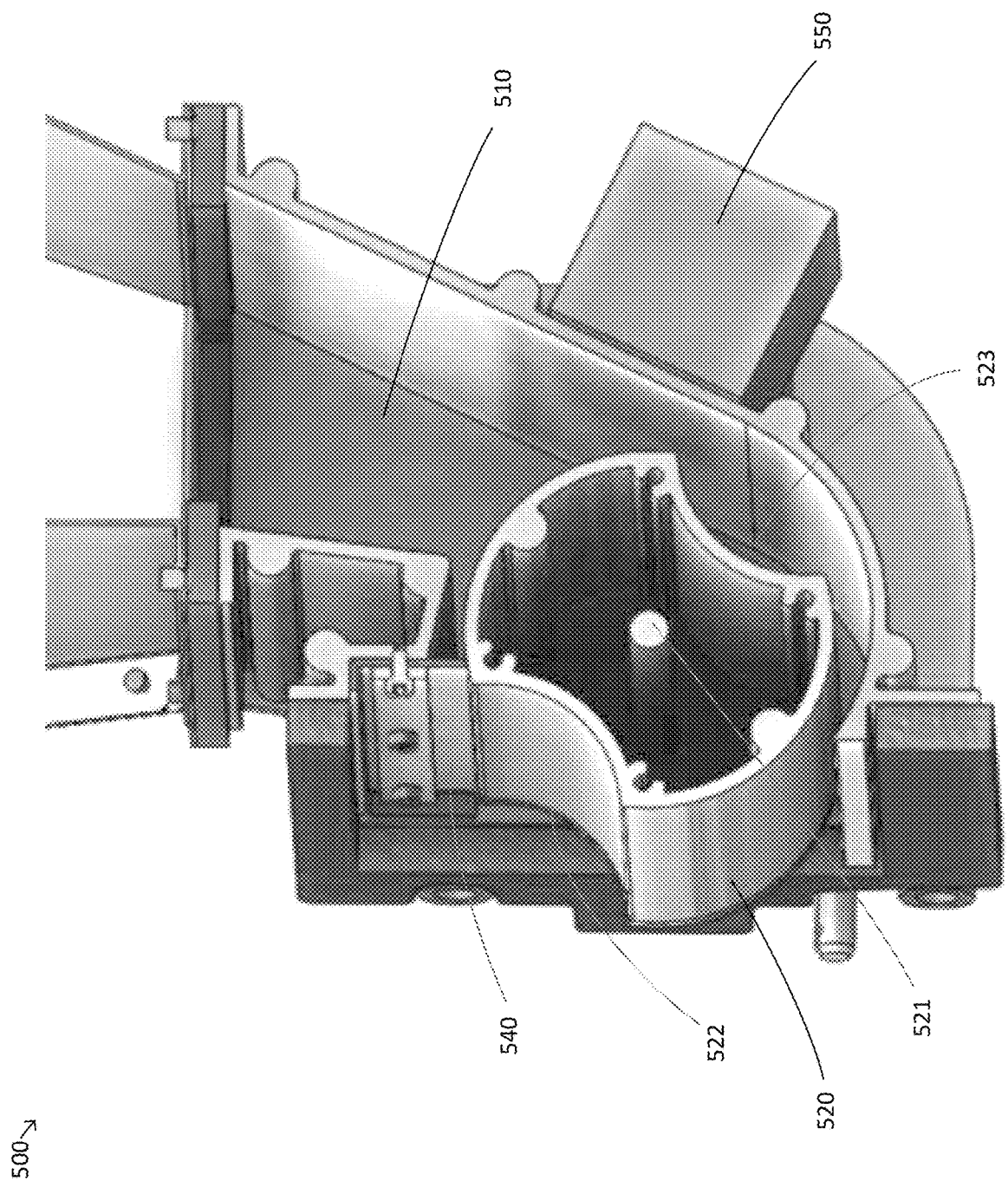
FIG. 5 depicts a perspective view of a powder deposition apparatus in which the doser comprises two cutout regions, according to some embodiments.

FIG. 5 depicts a perspective view of a powder deposition apparatus in which the doser comprises two cutout regions, according to some embodiments. In the example of FIG. 5, apparatus 500 comprises a gravity fed hopper 510 in which a powder may be arranged. At the bottom of the hopper is a doser 520 which, in the example of FIG. 5, is a cylinder configured to rotate about an axis 521 and includes cutout portions 522 and 523, which are both identically sized and shaped concave regions. A trough is arranged next to the doser, although for clarity only a portion of the trough is shown in FIG. 5. Apparatus 500 also includes a flexible component 540 which serves to retain powder within the hopper as discussed above. Motor 550 is configured to operate the doser to rotate the doser as described above. The motor may be coupled to a non-coaxial drivetrain system (not shown) to laterally separate the axis of rotation of the motor from that of the doser and to thermally isolate the motor from the doser and to thermally isolate the motor from the heated build area.

Figure 8:
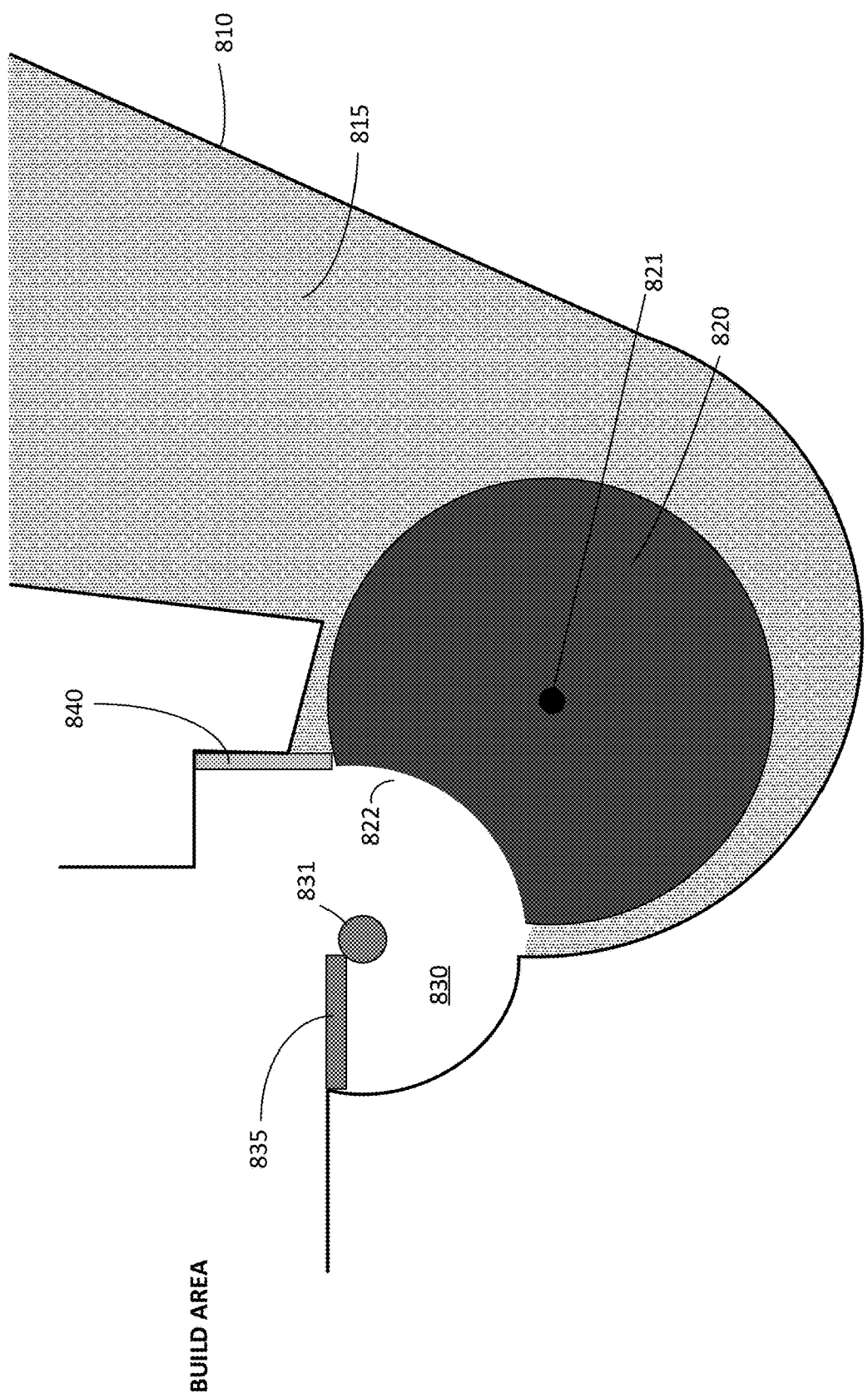
FIG. 8 depicts an illustrative powder delivery apparatus with a wide hopper, according to some embodiments.

FIG. 8 depicts an illustrative powder delivery apparatus with a wide hopper, according to some embodiments. Apparatus 800 may be arranged within a suitable additive fabrication system, such as additive fabrication device 100 shown in FIG. 1, wherein apparatus 800 would replace the powder delivery system 120, allowing the roller 125 or any other suitable recoating device to distribute powder supplied from the apparatus 800 onto a build area.

In the example of FIG. 8, apparatus 800 comprises a gravity fed hopper 810 in which a powder 815 may be arranged. At the bottom of the hopper is a doser 820 which, in the example of FIG. 8, is a cylinder configured to rotate about an axis 821 and includes a recess 822, which in the example of FIG. 8 is a cutout portion of the doser shaped as a concave region within the cylinder. Trough 830 is arranged next to the doser so that the doser is between the trough 830 and hopper 810. Trough 830 includes a flipper 835 configured to rotate about the axis 831 and thereby push up any powder in the trough so that it can be subsequently pushed into the build area by a recoater (not shown). Apparatus 800 also includes a component 840 which serves to retain powder 815 within the hopper. Component 840 may be flexible (e.g., may comprise a silicone rubber), rigid, or in some cases may be omitted in favor of a suitably small gap.

In contrast to FIG. 3, which depicts a similar powder delivery apparatus, apparatus 800 includes a widening portion of the hopper leading away from the trough. In particular, the space between the wall of the hopper 810 and the doser 820 is smallest adjacent to the trough 830, larger underneath the doser, and largest at the back of the doser, furthest from the trough. Compared with powder delivery apparatus 300 shown in FIG. 3, the configuration in FIG. 8 may prevent powder from compacting in the hopper while still maintaining a sufficiently small distance between the wall of the hopper and the doser adjacent to the trough to prevent powder from entering the hopper from the trough.

Although the embodiments discussed herein may relate to selective sintering technology, it should be understood that other embodiments within the scope of the invention may be advantageous in other processes in which powder is delivered into a desired volume or area. As such, it will be appreciated that delivery of powder to a build area of an additive fabrication device is not a requirement, as the doser/trough/hopper system may be operated as discussed herein to deliver powder to any desired location. As a non-limiting list of example, the techniques for powder delivery described herein may be utilized in a powder sifter, in baking or confection applications (e.g., to deliver powdered sugar), etc. In some cases, the trough may be omitted so that a doser and hopper may be operated in combination to repeatedly deliver the same amount of powder from the hopper into a desired location. In some cases, the flipper may be configured to remove powder from the doser without there being a trough present. As such, the flipper will remove the powder located in the cutout portion of the doser, and will do so upon each revolution of the doser.

Figure 6:
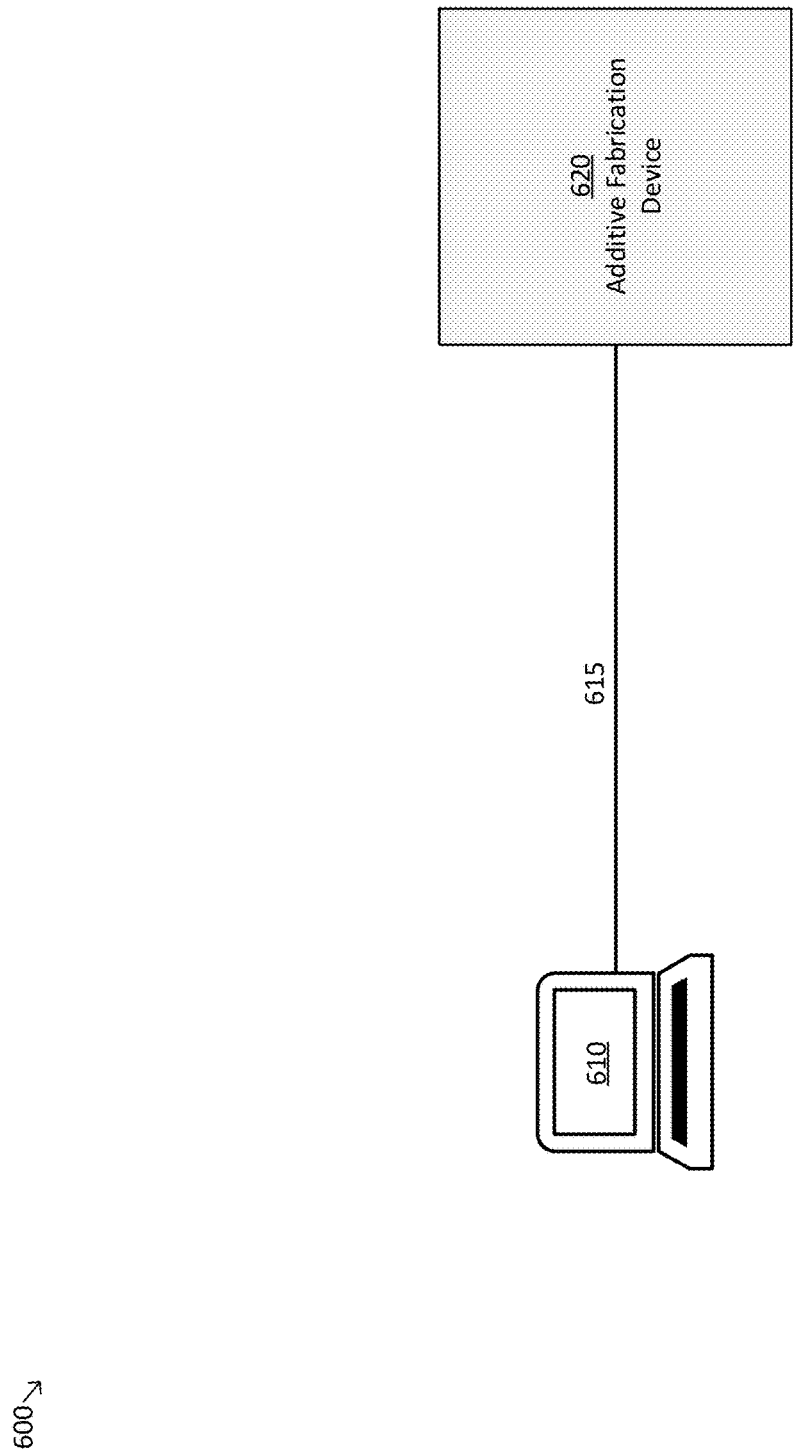
FIG. 6 is a block diagram of a system suitable for practicing aspects of the invention, according to some embodiments.

FIG. 6 is a block diagram of a system suitable for practicing aspects of the invention, according to some embodiments. System 600 illustrates a system suitable for generating instructions to perform additive fabrication by a device comprising a powder delivery apparatus, and subsequent operation of the additive fabrication device to fabricate an object. For instance, instructions to fabricate the object using an additive fabrication system may comprise instructions to operate a powder deposition mechanism. In some cases, the instructions may also, when executed by the additive fabrication device, cause the additive fabrication device to operate an energy source in concert with the powder deposition mechanism.

According to some embodiments, computer system 610 may execute software that generates two-dimensional layers that may each comprise sections of the object. Instructions may then be generated from this layer data to be provided to an additive fabrication device, such as additive fabrication device 620, that, when executed by the device, fabricates the layers and thereby fabricates the object. Such instructions may be communicated via link 615, which may comprise any suitable wired and/or wireless communications connection. In some embodiments, a single housing holds the computing device 610 and additive fabrication device 620 such that the link 615 is an internal link connecting two modules within the housing of system 600.

Figure 7:
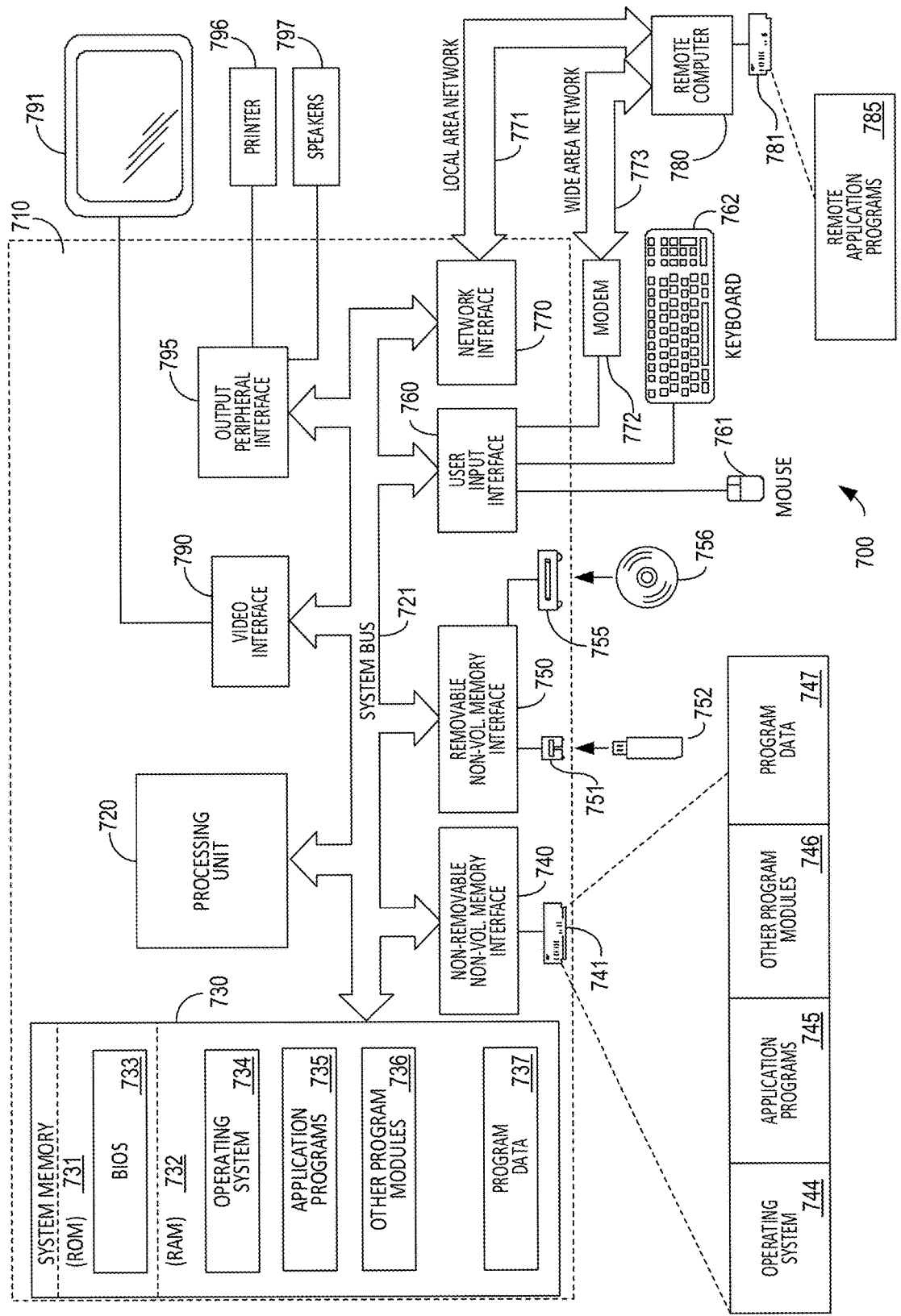
FIG. 7 illustrates an example of a computing system environment on which aspects of the invention may be implemented.

FIG. 7 illustrates an example of a suitable computing system environment 700 on which the technology described herein may be implemented. For example, computing environment 700 may form some or all of the computer system 610 shown in FIG. 6. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A powder delivery apparatus for an additive fabrication system, the powder delivery apparatus comprising:
   a hopper configured to hold a powder;
   a trough adjacent to a build area of the additive fabrication system;
   a doser comprising a barrel that includes a recess, the doser configured to rotate about an axis such that the recess may be moved into and out of the trough and the hopper by rotating the doser about the axis; and
   a flipper arranged within the trough and configured to push powder out of the trough.

2. The powder delivery apparatus of claim 1, wherein the recess includes a concave region.

3. The powder delivery apparatus of claim 1, wherein the recess is a first recess and wherein the barrel of the doser includes a second recess.

4. The powder delivery apparatus of claim 3, wherein the second recess is diametrically opposite to the first recess around the barrel.

5. The powder delivery apparatus of claim 1, wherein the flipper is arranged to pass through the recess of the doser when the recess is positioned within the trough.

6. The powder delivery apparatus of claim 1, wherein the doser is arranged within the hopper.

7. The powder delivery apparatus of claim 6, wherein the doser is arranged so that there is a gap between the doser and a bottom of the hopper into which powder in the hopper can flow.

8. The powder delivery apparatus of claim 1, wherein the doser is arranged between the hopper and the trough.

9. The powder delivery apparatus of claim 1, wherein the doser includes a non-stick coating.

10. The powder delivery apparatus of claim 1, wherein the doser has a circular cross-section, and wherein the recess has a cross-sectional shape such that the recess represents a circular segment cut away from the circular cross-section of the doser.

11. The powder delivery apparatus of claim 1, further comprising a flexible wall arranged above the doser and adjacent to the hopper to retain powder within the hopper.

12. An additive fabrication system comprising:
   a hopper configured to hold a powder;
   a trough adjacent to a build area of the additive fabrication system;
   a doser comprising a barrel that includes a recess, the doser configured to rotate about an axis such that the recess may be moved into and out of the trough and the hopper by rotating the doser about the axis, thereby carrying powder within the recess of the doser from the hopper to the trough and/or from the trough to the hopper;
   a flipper configured to move powder out of the trough to an area adjacent to the build area;
   a recoater configured to move powder from the area adjacent to the build area onto the build area; and
   at least one processor configured to deliver powder from the hopper to the build area of the additive fabrication system by:
      rotating the doser about the axis a plurality of times to convey powder from the hopper to the trough;
      operating the flipper to move powder out of the trough to the area adjacent to the build area; and
      operating the recoater to move powder from the area adjacent to the build area onto the build area.

13. The additive fabrication system of claim 12, wherein the recess includes a concave region.

14. The additive fabrication system of claim 12, wherein the recess is a first recess and wherein the barrel of the doser includes a second recess.

15. The additive fabrication system of claim 14, wherein the second recess is diametrically opposite to the first recess around the barrel.

16. The additive fabrication system of claim 12, wherein the doser is arranged within the hopper.

17. The additive fabrication system of claim 16, wherein the doser is arranged so that there is a gap between the doser and a bottom of the hopper into which powder in the hopper can flow.

18. A method of delivering powder to a build area of an additive fabrication system, the method comprising:
   operating a doser arranged within a hopper holding powder to deposit a desired volume of powder in a trough, wherein the doser comprises a barrel that includes a recess, and wherein operating the doser comprises:
      (a) rotating the doser such that the recess of the doser collects a dose of powder from within the hopper;
      (b) rotating the doser so that the recess moves into the trough, thereby depositing at least some of the dose of powder into the trough; and
      repeating steps (a) and (b) until an amount of powder in the trough reaches a steady state; and
   subsequent to the amount of powder in the trough reaching the steady state, operating a flipper within the trough to move the amount of powder out of the trough.

19. The method of claim 18, wherein the recess includes a concave region.

20. The method of claim 18, wherein the recess is a first recess and wherein the barrel of the doser includes a second recess.

* * * * *